United States Patent

Kobayashi et al.

Patent Number: 5,113,407
Date of Patent: May 12, 1992

[54] DISCHARGE TUBE FOR LASER OSCILLATOR

[75] Inventors: Eiji Kobayashi; Akira Egawa, both of Minamitsuru, Japan

[73] Assignee: Fanuc Ltd., Minamitsuru, Japan

[21] Appl. No.: 635,596

[22] PCT Filed: May 15, 1990

[86] PCT No.: PCT/JP90/00616

§ 371 Date: Jan. 8, 1990

§ 102(e) Date: Jan. 8, 1990

[87] PCT Pub. No.: WO90/15456

PCT Pub. Date: Dec. 13, 1990

[30] Foreign Application Priority Data

May 29, 1989 [JP] Japan .................. 1-135447

[51] Int. Cl.⁵ .............................. H01S 3/03
[52] U.S. Cl. .............................. 372/61; 372/34; 372/87; 372/88
[58] Field of Search ............. 372/61, 34, 87, 88

[56] References Cited

U.S. PATENT DOCUMENTS 4,953,176  8/1990  Ekstrand .................. 372/107

FOREIGN PATENT DOCUMENTS 0254747  3/1988  European Pat. Off. .
0003491  1/1979  Japan .................. 372/61
0209878  9/1987  Japan .................. 372/61

OTHER PUBLICATIONS

Patent Abstract of Japan, vol. 11, No. 288 (E-542) [2735], 17th Sep. 1987; & JP-A-62-88 384 (Mitsubishi Electric) Apr. 22, 1987 * Total *.
Patent Abstract of Japan, vol. 9, No. 131 (E-319) [1854], 6th Jun. 1985; & JP-A-60-17 975 (Mitsubishi Denki) Feb. 29, 1985 * Total *.
Patent Abstract of Japan, vol. 11, No. 148 (E-506) [2595], 14th May 1987; & JP-A-61 287 285 (Hitachi) Dec. 17, 1986 * Total *.

Primary Examiner—Georgia Y. Epps
Attorney, Agent, or Firm—Staas & Halsey

[57] ABSTRACT

At least one pair of electrodes (5a, 5b) are provided on the surface of a dielectric discharge tube (1), and radiating fins (2a, 2b) are attached to a part of the electrodes (5a, 5b). A ceramic clamp (3) and a stainless-steel backup plate (4) are engaged with recessed portions of the radiating fins (2a, 2b), to thereby fix the radiating fins (2a, 2b) in position. Accordingly, a rise in the temperature of the electrodes is reduced by radiating heat through the radiating fins, whereby a separation or deterioration of the electrodes (5a, 5b) is prevented.

9 Claims, 1 Drawing Sheet

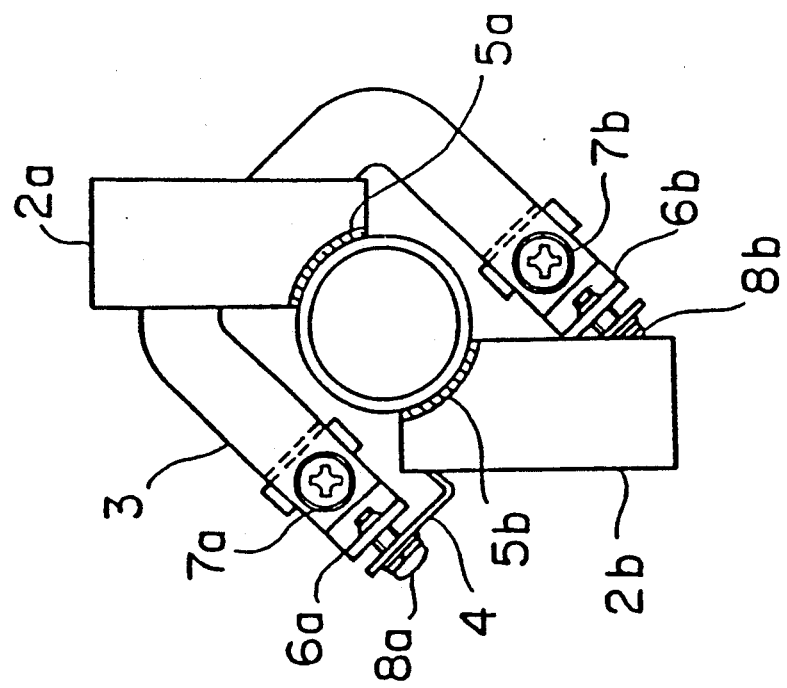
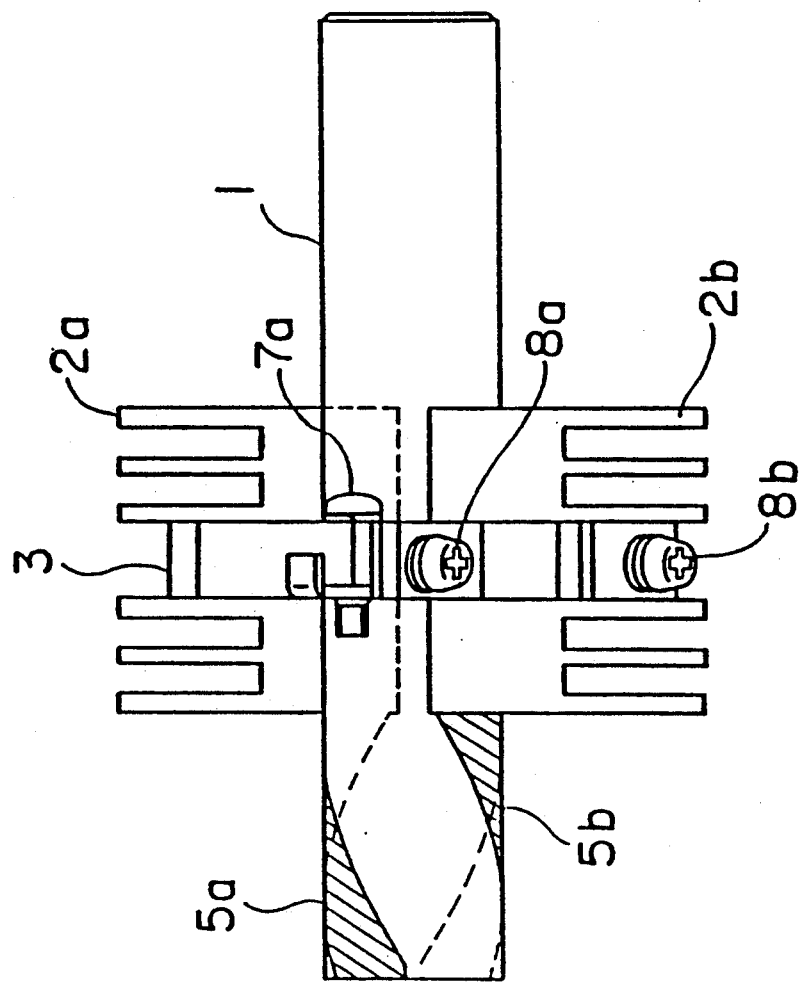

DISCHARGE TUBE FOR LASER OSCILLATOR

TECHNICAL FIELD

The present invention relates to a discharge tube for a laser oscillator used in a gas laser oscillator, and more particularly, to a discharge tube for a laser oscillator adapted to be driven by a high-frequency (including radio frequencies) ac power source.

BACKGROUND ART

In a gas laser oscillator, a dielectric discharge tube is generally formed of ceramics or quartz, a pair of electrodes are arranged on the outer surface of the discharge tube, and a high-frequency ac power is applied to these electrodes to excite gas in the discharge tube to thereby cause an electric discharge. Reflecting mirrors are provided separately on opposite sides of the discharge tube to thus form a laser oscillator.

The electrodes may be formed by a metal deposition process or by bonding a metallic tape to the surface of the discharge tube.

When the ac power is applied to the discharge tube to cause an electric discharge, however, the temperature inside the discharge tube rises, and as a result, the discharge tube temperature reaches 300° C. or thereabouts. Accordingly, a problem has arisen in that the electrodes are separated due to the difference in coefficient of thermal expansion between a dielectric constituting the discharge tube and a metal constituting the electrodes. Moreover, as the temperature of the electrode rises, the temperature of the ambient air rises, and thus a corona discharge occurs at the end portions of the electrodes, which causes a deterioration of the electrodes.

Therefore, to prevent a separation of the electrodes, a cushion is conventionally interposed between the electrodes and the discharge tube, and to prevent the corona discharge, a molded material, such as silicone, is applied to the end portions of the electrodes.

These processes require a reprocessing of the discharge tube, and the manufacture of the discharge tube requires substantial man-hours.

DISCLOSURE OF THE INVENTION

The present invention has been contrived in consideration of these circumstances, and an object thereof is to provide a discharge tube for a laser oscillator, in which the discharge tube is provided with radiating fins to prevent a rise in the temperature of electrodes.

To solve the above problem, according to the present invention, there is provided a discharge tube for a laser oscillator, which comprises at least one pair of electrodes formed on the surface of a dielectric discharge tube, and radiating fins attached to the respective end portions of the electrodes.

Accordingly, a rise in temperature of the electrodes is prevented by a radiation of heat therein through the radiating fins provided on the electrodes.

BRIEF DESCRIPTION OF THE DRAWINGS

FIG. 1(a) is a diagram showing a discharge tube for laser oscillator according to one embodiment of the present invention; and FIG. 1(b) is a side view corresponding to FIG. 1(a).

BEST MODE OF CARRYING OUT THE INVENTION

One embodiment of the present invention will now be described with reference to the drawings.

FIG. 1(a) is a diagram showing a discharge tube for a laser oscillator according to one embodiment of the present invention, and FIG. 1(b) is a side view corresponding to FIG. 1(a). As shown in the Figures, a ceramic or quartz pipe is used as the discharge tube 1, and a pair of electrodes 5a and 5b are arranged spirally on the surface of the discharge tube 1. These electrodes 5a and 5b may formed by a metal deposition process or by bonding a metallic tape thereto.

Aluminum radiating fins 2a and 2b are arranged separately on opposite sides of the discharge tube 1, and in close contact with the electrodes 5a and 5b, respectively. This is accomplished by cutting out a quarter circle from an end portion of each of the radiating fins 2a and 2b. Further, the central portion of each radiating fin is recessed to be fixed to the discharge tube 1. A ceramic clamp 3 and a stainless-steel backup plate 4 are engaged with the respective recessed portions of the radiating fins 2a and 2b, to thereby fix the radiating fins 2a and 2b in position. The clamp 3 is formed of ceramic material, and therefore, is coupled to members 6a and 6b by screws 7a and 7b, and the members 6a and 6b are coupled to the backup plate 4 by screws 8a and 8b, respectively.

The backup plate 4 is flexible, and thus holds the radiating fans 2a and 2b on the discharge tube 1 by the spring function thereof. The clamp 3 is formed of ceramic material because a ceramic material has a small coefficient of expansion when subjected to a rise in temperature. The backup plate 4 is formed of a stainless steel, because the tenacity of stainless steel is not lowered by a high temperature.

Accordingly, even if the temperature of the discharge tube 1 is increased by an electric discharge, the resulting heat is radiated into the air via the radiating fins 2a and 2b, and therefore, a rise in the temperature of the electrodes 5a and 5b, which are heated to a particularly high temperature, is prevented. The use of these radiating fins enables the temperature to be lowered by a margin of about 100° to 150° C., when used in a $CO_2$ gas laser with an output of 1 kW or thereabout. If the output of the laser is higher, the temperature of the electrodes can be further lowered by air-cooling the radiating fins 2a and 2b by a fan.

Therefore, a separation of the electrodes 5a and 5b from the discharge tube 1 can be prevented, and further, a deterioration of the electrodes 5a and 5b due to a corona discharge is also prevented.

It is to be understood that this effect can be also produced with the use of electrodes formed by a metal deposition process or by a metallic tape.

According to the present invention, as described above, the temperature rise attributable to an electric discharge is reduced by fitting the radiating fins to the end portions of the electrodes, and thus a separation or deterioration of the electrodes can be prevented.

We claim:

1. A discharge tube for a laser oscillator, comprising:
   at least one pair of electrodes formed on a surface of a dielectric discharge tube; and
   radiating fins attached to respective end portions of said electrodes, said radiating fins each having a recessed portion in the center, said recessed portion being fixed to said discharge tube by a clamp and a tenacious backup plate.

2. Discharge tube structure for a laser oscillator comprising:
   a dielectric discharge tube;
   a first electrode having a first end portion;
   a second electrode having a second end portion, said first and second end potions being disposed in spaced relationship relative to one another on the outer surface of said discharge tube;
   a first heat radiating fin assembly mounted on said tube and including a segment disposed in close heat conducting contact with said first end portion; and
   a second heat radiating fin assembly mounted on said tube and including a segment disposed in close heat conducting contact with said second end portion.

3. A discharge tube structure as set forth in claim 2, wherein said end portions are disposed on opposite sides of said discharge tube.

4. A discharge tube structure as set forth in claim 3, wherein is included a single clamp device for holding said segments of the first and second assemblies on said tube in said close heat conducting contact with said electrode end portions.

5. A discharge tube structure as set forth in claim 2, wherein each of said electrodes is formed by a metal deposition process.

6. A discharge tube structure as set forth in claim 2, wherein each of said electrodes is formed of a metallic tape.

7. A discharge tube structure as set forth in claim 2, wherein said radiating fins are formed of aluminum.

8. A discharge tube structure as set forth in claim 4, wherein each of said segments comprises a recessed portion in the center of the respective assembly, said device including a clamp and a tenacious backup plate for holding the segments against the corresponding end portion.

9. A discharge tube structure as set forth in claim 2, wherein is included a fan for air-cooling said radiating fins.

* * * * *

UNITED STATES PATENT AND TRADEMARK OFFICE
CERTIFICATE OF CORRECTION

PATENT NO. : 5,113,407
DATED : May 12, 1992
INVENTOR(S) : EIJI KOBAYASHI and AKIRA EGAWA It is certified that error appears in the above-identified patent and that said Letters Patent is hereby corrected as shown below:

TITLE PAGE [86] "§371 Date and §102(e) Date" should be
-- Jan. 8, 1991--.

Signed and Sealed this

Eighth Day of March, 1994

Attest:

BRUCE LEHMAN

Attesting Officer  Commissioner of Patents and Trademarks